(12) United States Patent
Mu

(10) Patent No.: US 10,665,958 B2
(45) Date of Patent: May 26, 2020

(54) BEAMFORMING RECEIVER

(71) Applicant: Telefonaktiebolaget LM Ericsson (publ), Stockholm (SE)

(72) Inventor: Fenghao Mu, Hjärup (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 228 days.

(21) Appl. No.: 15/556,345

(22) PCT Filed: Mar. 19, 2015

(86) PCT No.: PCT/EP2015/055809
§ 371 (c)(1),
(2) Date: Sep. 7, 2017

(87) PCT Pub. No.: WO2016/146196
PCT Pub. Date: Sep. 22, 2016

(65) Prior Publication Data
US 2018/0109004 A1    Apr. 19, 2018

(51) Int. Cl.
*H01Q 21/06* (2006.01)
*H04B 7/0408* (2017.01)
*H04B 7/08* (2006.01)
*H01Q 3/24* (2006.01)

(52) U.S. Cl.
CPC ............ *H01Q 21/061* (2013.01); *H01Q 3/24* (2013.01); *H04B 7/0408* (2013.01); *H04B 7/0848* (2013.01); *H04B 7/0868* (2013.01)

(58) Field of Classification Search
CPC ...... H01Q 21/061; H01Q 3/24; H04B 7/0408; H04B 7/0848; H04B 7/0868
See application file for complete search history.

(56) References Cited

U.S. PATENT DOCUMENTS

| | | | |
|---|---|---|---|
| 5,351,317 A | 9/1994 | Weber | |
| 5,565,873 A | 10/1996 | Dean | |
| 6,018,316 A | 1/2000 | Rudish et al. | |
| 6,064,338 A | 5/2000 | Kobayakawa et al. | |
| 6,636,726 B1 | 10/2003 | Erhage | |

(Continued)

FOREIGN PATENT DOCUMENTS

| | | |
|---|---|---|
| WO | 2012098437 A1 | 7/2012 |
| WO | 2014116090 A1 | 7/2014 |

OTHER PUBLICATIONS

Kundu, S. et al., "A Compact, Supply-Voltage Scalable 45-66 GHz Baseband-Combining CMOS Phased-Array Receiver", IEEE Journal of Solid-State Circuits, Feb. 2015, pp. 527-542, vol. 50, No. 2.

(Continued)

*Primary Examiner* — Ankur Jain
(74) *Attorney, Agent, or Firm* — Coats & Bennett, PLLC

(57) ABSTRACT

A beamforming receiver 100 for receiving multiple radio signals and generating multiple output beam signals is disclosed. The beamforming receiver (100) comprises multiple beam parameter inputs (130) to receive multiple beam parameters and an element array (110) comprising a plurality of elements (120). The beamforming receiver 100 further comprises a loading unit 140 coupled to each element 120 in the element array 110. The beamforming receiver 100 further comprises a reference clock generating and splitting circuit 150 to generate and distribute reference clock signals for each element 120.

22 Claims, 15 Drawing Sheets

(56) References Cited

U.S. PATENT DOCUMENTS

| | | | |
|---|---|---|---|
| 7,176,721 | B2 | 2/2007 | Ho et al. |
| 7,233,164 | B2 | 6/2007 | Stojanovic et al. |
| 7,715,471 | B2 | 5/2010 | Werner et al. |
| 7,733,980 | B2 | 6/2010 | Beukema et al. |
| 8,743,914 | B1 | 6/2014 | Jensen |
| 2005/0134307 | A1 | 6/2005 | Stojanovic et al. |
| 2005/0157781 | A1 | 7/2005 | Ho et al. |
| 2009/0213770 | A1 | 8/2009 | Mu |
| 2010/0013527 | A1* | 1/2010 | Warnick .......... H01Q 3/26 327/129 |
| 2010/0073233 | A1 | 3/2010 | Young et al. |
| 2010/0266006 | A1 | 10/2010 | Werner et al. |
| 2011/0109507 | A1* | 5/2011 | Warnick .......... H01Q 21/0025 342/368 |
| 2012/0121043 | A1 | 5/2012 | Wambacq |
| 2013/0222183 | A1 | 8/2013 | Lin |
| 2013/0293411 | A1* | 11/2013 | Dehlink .......... G01S 3/043 342/194 |
| 2013/0337757 | A1 | 12/2013 | Szortyka et al. |
| 2014/0354499 | A1 | 12/2014 | Legay et al. |
| 2016/0006122 | A1* | 1/2016 | Seol .......... H04B 7/0408 342/372 |
| 2016/0156325 | A1* | 6/2016 | Boutayeb .......... H01P 1/208 455/101 |
| 2016/0316480 | A1* | 10/2016 | Oh .......... H04B 7/0608 |

OTHER PUBLICATIONS

Nishio T., et al., "A High-speed Adaptive Antenna Array with Simultaneous Multiple-Beamforming Capability", IEEE MTT-S International Microwave Symposium Digest, Jun. 8-13, 2003, pp. 1673-1676, Philadelphia, US.

Jeon, S. et al., "A Novel Smart Antenna System Implementation for Broad-Band Wireless Communications", IEEE Transactions on Antennas and Propagation, May 2002, pp. 600-606, vol. 50, No. 5.

Wijenayake, C., et al., "Hexagonal Multi-Beam Analog RF Aperture Array", IEEE International Symposium on Circuits and Systems (ISCAS), Jun. 1-5, 2014, pp. 1680-1683.

Alfred, Q. et al., "A Schematic for Broadband Beam Formation Using Time-Delay Technique", Progress in Electromagnetics Research M, 2008, pp. 131-139, vol. 3.

Imec, "Imec demonstrates low power beamforming transceiver chipset for 60GHz multi-Gbit wireless communication", Imec News, Feb. 20, 2013, p. 1.

Axholt, A. et al., "A 24-GHz 90-nm CMOS Beamforming Receiver Front-End with Analog Baseband Phase Rotation", Proceedings of the ESSCIRC, Sep. 14-16, 2010, pp. 346-349.

Kalia, S. et al., "Multi-Beam Spatio-Spectral Beamforming Receiver for Wideband Phased Arrays", IEEE Transactions on Circuits and Systems—I: Regular Papers, Aug. 2013, pp. 2018-2029, vol. 60, No. 8.

Aerts, W., et al., "Conceptual Study of Analog Baseband Beam Forming: Design and Measurement of an Eight-by-Eight Phased Array", IEEE Transactions on Antennas and Propagation, Jun. 2009, pp. 1667-1672, vol. 57, No. 6.

Sadhu, B. et al., "Analysis and Design of a 5 GS/s Analog Charge-Domain FFT for an SDR Front-End in 65 nm CMOS", IEEE Journal of Solid-State Circuits, May 2013, pp. 1199-1211, vol. 48, No. 5.

Patnaik, S. et al., "An 8GHz Multi-Beam Spatio-Spectral Beamforming Receiver Using an All-Passive Discrete Time Analog Baseband in 65nm CMOS", IEEE Custom Integrated Circuits Conference (CICC), Sep. 9-12, 2012, pp. 1-4, San Jose, US.

* cited by examiner

BEAMFORMING RECEIVER

TECHNICAL FIELD

Embodiments herein relate to a beamforming receiver. In particular, they relate to a beamforming receiver for receiving multiple radio signals and generating multiple output beam signals in a wireless communication system.

BACKGROUND

Beamforming is a signal processing technique for directional signal transmission or reception. This is achieved by combining antenna elements in a phased array in such a way that signals at particular angles or directions experience constructive interference while others experience destructive interference. Beamforming can be used at both the transmitting and receiving ends in order to achieve spatial selectivity. Beamforming is for instance intended to be used in the 5th generation (5G) wireless communications system. The beamforming can be performed at different parts along the signal path, such as in radio frequency (RF), in intermediate frequency (IF), in baseband (BB) frequency or in digital domain.

Digital beamforming (DBF) has many advantages, including the ability to apply multiple sets of weight vectors simultaneously to receive multiple beams. For example, in phased array receivers, multiple beams may be created from digitalized signals after analog to digital converters (ADCs) in each channel of the receiver. However, there are some drawbacks to DBF, e.g. the need to have separate receive chains from each antenna element through the ADCs. Therefore, to create multiple beams, high speed ADCs are needed which are very power hungry. Another issue is that the data rate created from each channel is very high, and data links have to be connected from chip-to-chip or die-to-die. This may require high speed field-programmable gate arrays (FPGAs) with many input/output (I/O) pins to receive the signals from the ADCs, which leads to huge data rate and complicated data interfaces. Thus, this type of configuration requires significant power, which may lead to heat dissipation issues. Further, some DBF algorithms require so much processing that large array with many elements become impractical.

It is difficult to perform multiple beam forming in RF and IF paths. There are some multiple beamforming methods performed in baseband. For example, an antenna array with analog beamforming (ABF) capability may be utilized for receiving RF signals. The ABF array manipulates the phase and/or gain of signals arriving at each element, then sums the signals, and continues processing on the signals e.g., utilizing ADCs.

The patent application U.S. Pat. No. 8,743,914 discloses an analog beamforming receiver for forming multiple simultaneous independent beams. The analog beamforming receiver includes a first receive element for receiving a signal, where the first receive element is coupled with circuitry for sequentially adjusting at least one of a phase or a gain of the signal received by the first receive element. The analog beamforming receiver may also include a second receive element for receiving the signal, where the second receive element is coupled with circuitry for sequentially adjusting at least one of a phase or a gain of the signal received by the second receive element. The analog beamforming receiver further includes a combiner coupled with the first receive element and the second receive element for combining the phase or gain adjusted signals from the first receive element and the second receive element to form a combined analog signal. The analog beamforming receiver also includes an analog to digital converter coupled with the combiner for converting the combined analog signal from the combiner into a digital signal. The analog beamforming receiver further includes a demultiplexer coupled with the analog to digital converter for demultiplexing the digital signal from the analog to digital converter into a plurality of demultiplexed signals forming a plurality of multiple simultaneous independent beams. In this analog beamforming receiver, a number of simultaneous beams are determined by the maximum sample rate of the ADC, the sample rate per beam and the ABF switching time.

SUMMARY

Therefore it is an object of embodiments herein to provide an analog beamforming receiver for generating multiple beams. Some embodiments of the present invention are based on the inventor's insight that an obstacle to implementing such beamforming receivers, especially for relatively large arrays, is the distribution of control signals, or control parameters, for controlling e.g. the beam direction to the elements in the array.

According to embodiments herein, the object is achieved by a beamforming receiver for receiving multiple radio signals and generating multiple output beam signals. The beamforming receiver comprises multiple beam parameter inputs to receive multiple beam parameters. The beamforming receiver further comprises an element array comprising a plurality of elements. Each element comprises an antenna to receive the multiple radio signals; an amplifier to amplify the received multiple radio signals; a mixer to down-convert the amplified multiple radio signals and generate in-phase and quadrature phase signals; a filter to filter the generated in-phase and quadrature phase signals and generate in-phase and quadrature phase input signals. Each element further comprises a plurality K of Phase Rotator and Amplitude control Units (PRAU) configured to perform phase rotation and amplitude control of the in-phase and quadrature phase input signals based on phase and amplitude control parameters and generate multiple analog output signals with individual phase shifts. Each element further comprises a parameter calculator to generate the phase and amplitude control parameters from the multiple beam parameters which are related to K directions of the multiple radio signals.

Since the beamforming receiver according to embodiments herein comprises an element array and each element comprises a number K of phase rotator and amplitude control units, all in parallel, at least K multiple output beam signals may be generated simultaneously. The phase rotator and amplitude control unit according to embodiments herein has relatively high accuracy and low power. Further, since each element comprises a parameter calculator, the phase and amplitude control parameters may be generated quickly and distributed locally to each phase rotator and amplitude control unit, therefore data interfaces are simple. Furthermore delays, noises and heating issues etc. which related to high speed data lines are reduced.

Thus, embodiments herein provide a beamforming receiver with improved performance on e.g. power consumption, accuracy etc. and which is easy to implement.

BRIEF DESCRIPTION OF THE DRAWINGS

Examples of embodiments herein are described in more detail with reference to attached drawings in which.

DETAILED DESCRIPTION

Figure 1:
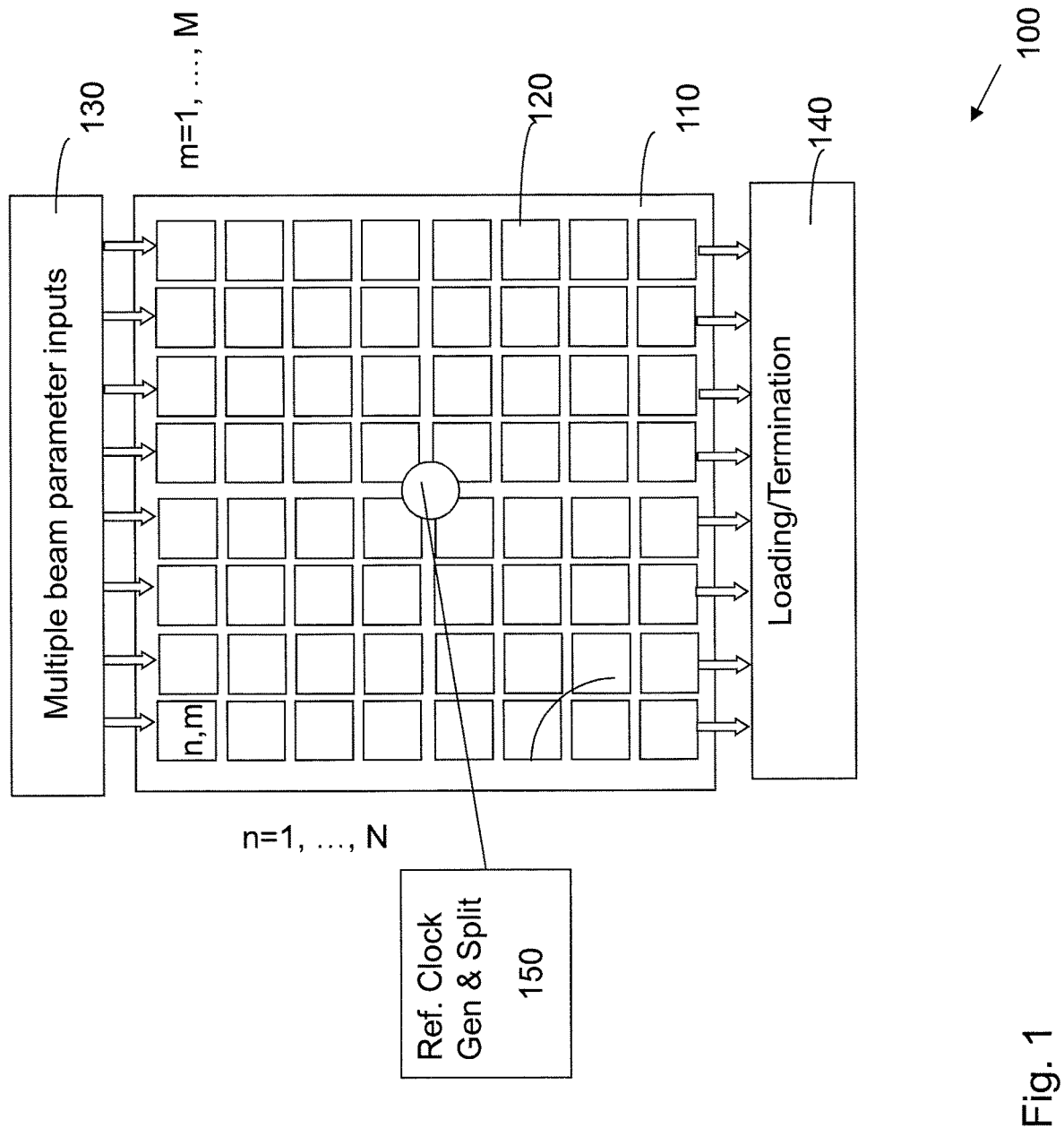
FIG. 1 is a general block view of a beamforming receiver according to embodiments herein.

A general block view of a beamforming receiver 100 for receiving multiple radio signals and generating multiple output beam signals according to embodiments herein is shown in FIG. 1. The beamforming receiver 100 comprises an element array 110 which comprising a plurality of elements 120. The beamforming receiver 100 further comprises multiple beam parameter inputs 130 to receive multiple beam parameters. The beamforming receiver 100 further comprises a loading unit 140 coupled to each element 120 in the element array 110. The beamforming receiver 100 further comprises a reference clock generating and splitting circuit 150 to generate and distribute reference clock signals for each element 120.

The plurality of elements 120 in the element array 110 may be arranged to form different shapes. In the example shown in FIG. 1, an 8×8 element array in a square shape is shown, i.e. the element array 110 has N=8 rows and M=8 columns, or N=8 elements in each column and M=8 elements in each row. Each element 120 in the element array 110 is identified by an address index <n, m>, where n= 1, ... N and m=1, ... M, which means the element is in the n-th row and m-th column of the element array 110. Although the row and column defined here are referred to FIG. 1 in its direction in a conventional way, they will not set limitations to the configuration of the element array 110. For example, the element array 110 may comprise M rows and N columns, if the element array 110 in FIG. 1 is rotated 90 degree either to the right or left. The array can also be rotated in any arbitrary angle such that neither the rows nor the columns are horizontal or vertical.

Figure 2:
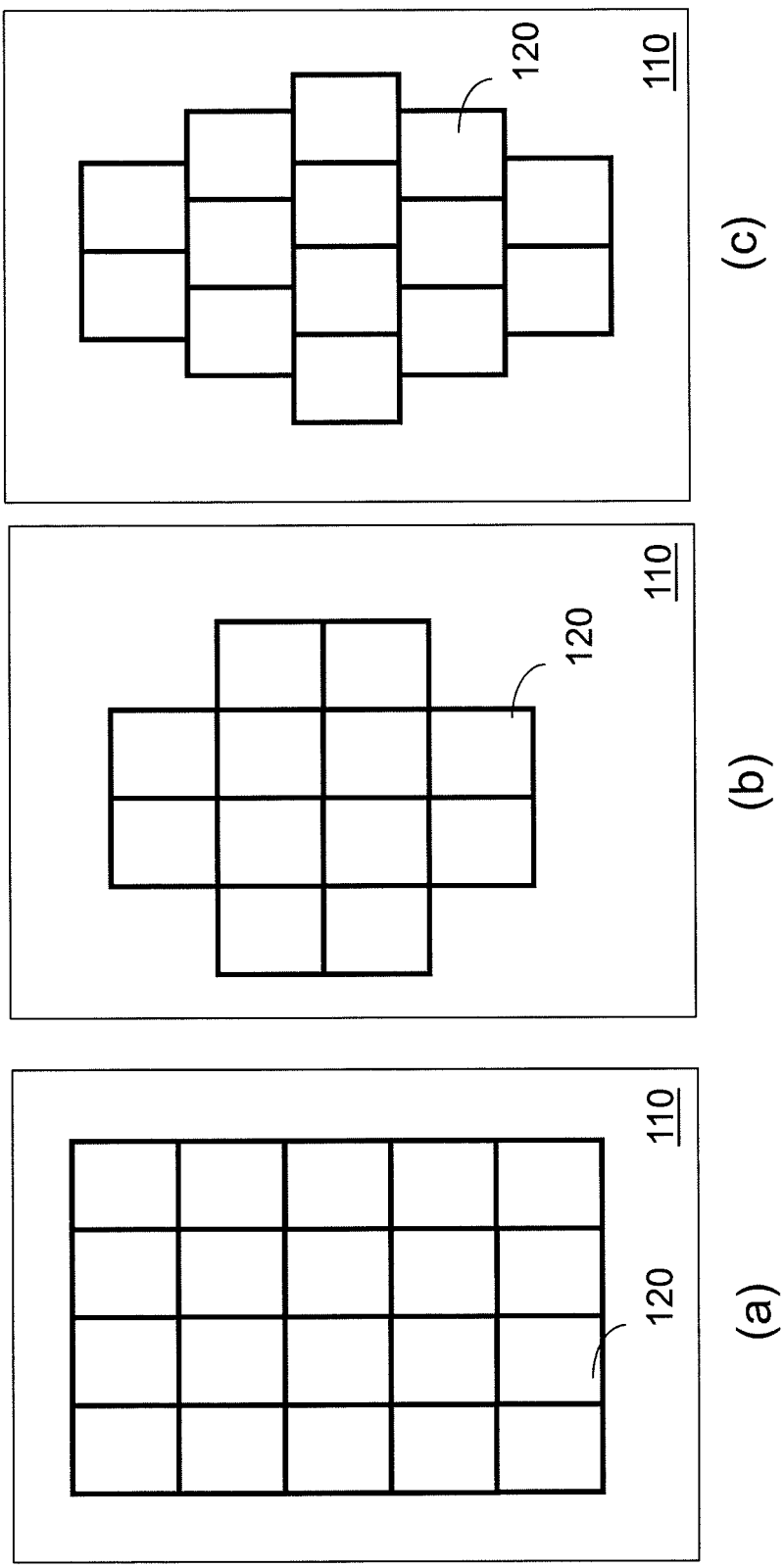
FIG. 2 shows block views illustrating different element array shapes implemented in the beamforming receiver according to embodiments herein.

According to some embodiments herein, the element array 110 may be formed in any other shape than the square shape as shown in FIG. 1. For example, as shown in FIG. 2, the element array 110 may be formed in different shapes and may comprise N rows and M columns, where N may or may not be equal to M. The element array 110 may be arranged to form a rectangle shape as shown in FIG. 2(a), where numbers of rows and columns are not equal. The element array 110 may be arranged to form a cross shape as shown in FIG. 2(b), where elements at corners of the array are omitted. More generally speaking, in some embodiments, all rows do not need to include the same number of columns. Vice versa, all columns do not need to include the same number of rows. In such embodiments, the numbers N and M may be seen as the maximum number of rows (in a column) and the maximum number of columns (in a row), respectively. Thus, in such embodiments, there may be at least one row that has fewer columns than at least one other row. Conversely, there may be at least one column that has fewer rows than at least one other column. The element array 110 may be arranged to form a hexagon shape as shown in FIG. 2(c), where each consecutive row has a different numbers of elements and are placed with an offset to each other, thus columns formed by the elements are not in straight lines.

Figure 3:
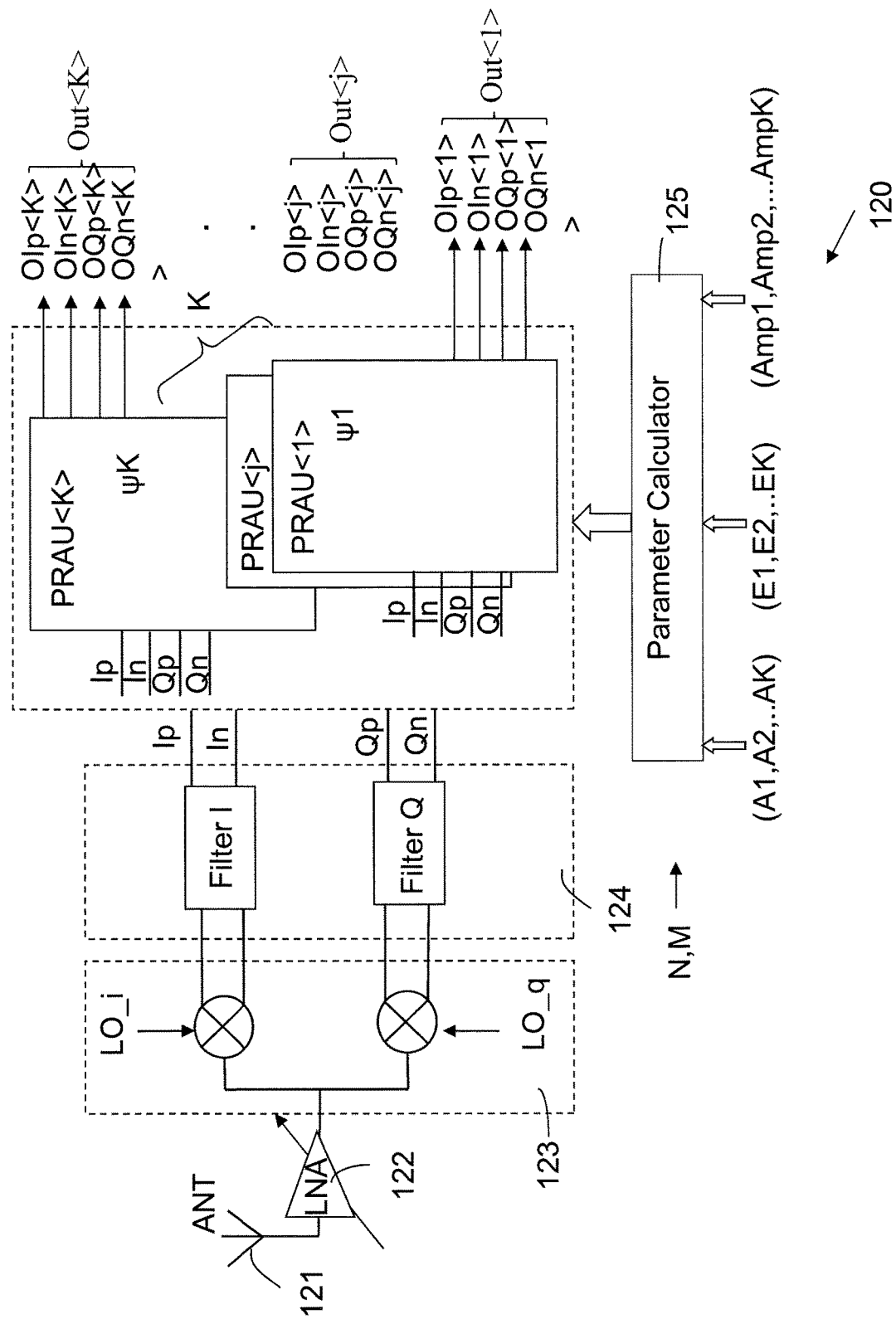
FIG. 3 is a schematic block view illustrating an element comprised in the beamforming receiver according to embodiments herein.

FIG. 3 shows an example of the element 120 according to embodiments herein. The element 120 has at least one channel or branch which comprises an antenna 121 to receive the multiple radio signals; an amplifier 122 to amplify the received multiple radio signals; a mixer 123 to down-convert the amplified multiple radio signals and generate in-phase and quadrature phase signals; a filter 124 to filter the generated in-phase and quadrature phase signals and generate in-phase and quadrature phase input signals; and a plurality K of Phase Rotator and Amplitude control Units, PRAU<1>, ... PRAU<j>, ... PRAU<K>, which are configured to perform phase rotation and amplitude control of the in-phase and quadrature phase input signals based on the phase and amplitude control parameters and generate multiple analog output signals, Out<1>, Out<j>, ... Out<K>, with individual phase shifts, ψ1, ... ψj, ... ψK.

The element 120 further comprises a parameter calculator 125 to generate the phase and amplitude control parameters from multiple beam parameters. The multiple beam parameters are related to K directions of the multiple radio signals. In the embodiments and examples presented below, they comprise azimuth vector, A1, ... , AK, elevation vector, E1, ... , EK, and amplitude vector, Amp1, ... , AmpK. However, in other embodiments, the parameters may be encoded in different form than such vectors.

Individual, or local, control parameters for the PRAUs in each element depends on the location, or position, of that element in the array. Based on knowledge of the location, which can be programmed or hardcoded into the parameter calculator 125 of each element, e.g. by the address index <n, m>, the parameter calculator can compute these individual control parameters from the multiple beam parameters. By distributing the same multiple beam parameters to several (e.g. all) elements of the array, and then utilizing the parameter calculator 125 in each element to generate the local control parameters for the PRAUs in each element locally, the overall control interface for the beamforming receiver can be simplified to a large extent. Consider for instance an alternative implementation as a reference example, where the local control parameters for all elements are generated centrally in a global control unit of the beamforming receiver, and all of these local control parameters are distributed to the elements in the array via a control interface. In this case, the number of control parameters that need to be distributed would be very large, and increases with an increasing number of elements in the array, and may limit the number of elements that can be practically implemented e.g. due to complex wire routing and control interface needed to distribute the control parameters. Using a solution with local parameter calculators 125 in each element as proposed in embodiments herein, the complexity of the control interface and wire routing can be largely reduced compared with the reference example, e.g. facilitating larger arrays.

According to some embodiments, the element 120 may have more than one channel, for instance 4 or 8 channels, which may be viewed as paralleled structures with corresponding duplications of the circuits mentioned above, of course some of the circuits may be shared. If the element 120 has more than one channel, the vector dimension for azimuth vector A1, . . . AK, elevation vector, E1, . . . EK, and amplitude vector, Amp1, . . . , AmpK and the address index n and m, may be duplicated, or local address may be inserted.

All elements in the element array 110 are synchronized by a reference clock. The reference clock may be, e.g. generated in the reference clock generating and splitting circuit 150, which is usually located in the centre of the element array 110. Synchronization may be achieved by matching the delays in the clock distribution networks to the different elements The multiple beam parameters, i.e. information on azimuth and elevation angles and amplitude control for K multiple radio signals, are sent either by point-to-point or in broadcast way, or by many other means to the beamforming receiver 100, and then received by each element 120 via the multiple beam parameter inputs 130 through data bus.

According to some embodiments, each PRAU<1>, . . . PRAU<j>, . . . PRAU<K> is configured to perform phase rotation and amplitude control of the in-phase and quadrature phase input signals and generate one output Out<j> of the multiple analog output signals Out<1>, . . . Out<j>, . . . Out<K> with an individual phase shift ψj.

In general, operations performed on a quadrature signal I, Q with a phase rotation of θ and amplitude control of α, to generate a phase rotated and amplitude controlled quadrature signal, OI and OQ, may be expressed as $$\begin{bmatrix} OI \\ OQ \end{bmatrix} = \begin{bmatrix} a\cos(\theta), & a\sin(\theta) \\ -a\sin(\theta), & a\cos(\theta) \end{bmatrix} \begin{bmatrix} I \\ Q \end{bmatrix} = \begin{bmatrix} a11, & a12 \\ a21, & a22 \end{bmatrix} \begin{bmatrix} I \\ Q \end{bmatrix} \quad (2)$$

Where, the four factors a11, a12, a21, a22 are merged phase rotation and amplitude control coefficients. The operation in Eq. (2) is shown in a signal flow chart in FIG. 4(a).

According to some embodiments herein, the four factors a11, a12, a21, a22 in Eq.(2) may be split into amplitudes A11, A12, A21, and A22, and signs, so the amplitudes are always positive, i.e. larger or equal 0. Then the sign of the function sin and cos of the phase θ are split into 4 positive sign signals pa11, pa12, pa21 and pa22, and 4 negative sign signals na11, na12, na21 and na22, so that $$paij = \begin{cases} 1, & aij \geq 0 \\ 0, & aij < 0 \end{cases} \quad (3)$$

$$naij = \begin{cases} 0, & aij \geq 0 \\ 1, & aij < 0 \end{cases}$$

for $i, j \in [1, 2]$

Then aij may be expressed as $$aij = paij \cdot Aij + naij \cdot Aij \quad (4)$$

Figure 4:
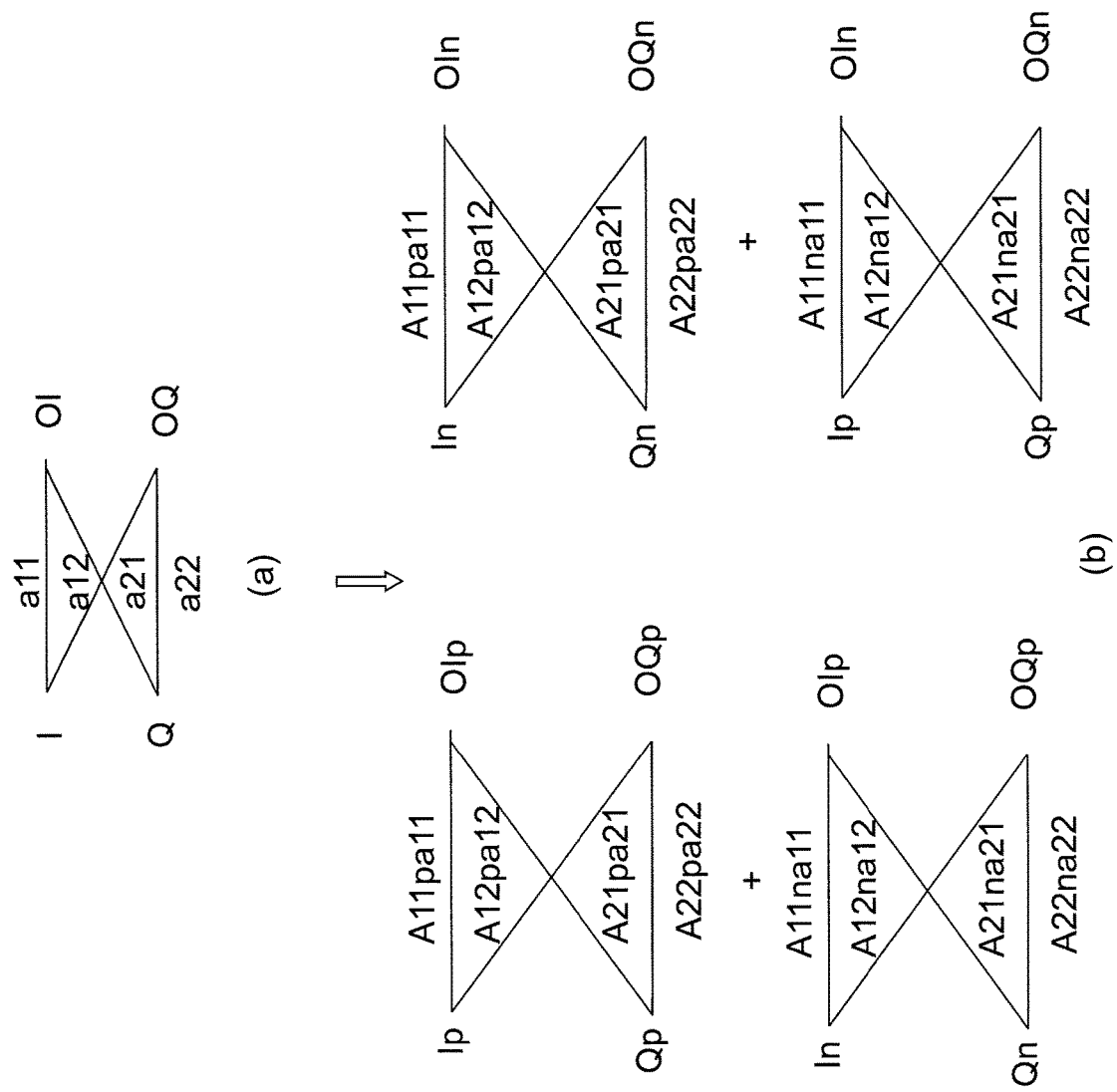
FIG. 4 shows signal flow charts illustrating phase rotation and amplitude control operations.

As such, the operation of Eq.(2) may be implemented in a differential style as shown in the signal flow chart in FIG. 4(b), where the original structure (a) is converted into differential absolute value weighted style in (b). Thus, the operation in Eq. (2) may be expressed by partial summed differential signal forms as $$\begin{bmatrix} OIp \\ OQp \end{bmatrix} = \begin{bmatrix} A11 \cdot pa11, & A12 \cdot pa12 \\ A21 \cdot pa21, & A22 \cdot pa22 \end{bmatrix} \begin{bmatrix} Ip \\ Qp \end{bmatrix} \quad (5)$$

$+$ $$\begin{bmatrix} OIp \\ OQp \end{bmatrix} = \begin{bmatrix} A11 \cdot na11, & A12 \cdot na12 \\ A21 \cdot na21, & A22 \cdot na22 \end{bmatrix} \begin{bmatrix} In \\ Qn \end{bmatrix}$$

$$\begin{bmatrix} OIn \\ OQn \end{bmatrix} = \begin{bmatrix} A11 \cdot pa11, & A12 \cdot pa12 \\ A21 \cdot pa21, & A22 \cdot pa22 \end{bmatrix} \begin{bmatrix} In \\ Qn \end{bmatrix}$$

$+$ $$\begin{bmatrix} OIn \\ OQn \end{bmatrix} = \begin{bmatrix} A11 \cdot na11, & A12 \cdot na12 \\ A21 \cdot na21, & A22 \cdot na22 \end{bmatrix} \begin{bmatrix} Ip \\ Qp \end{bmatrix}$$

Each PRAU<1>, . . . PRAU<j>, . . . PRAU<K> is configured to perform operations expressed in Eq. (5) on the in-phase and quadrature phase input signals. By splitting the phase rotation and amplitude control parameters to positive amplitudes and positive and negative sign control signals, the PRAUs may be implemented easily and accurately.

Figure 5:
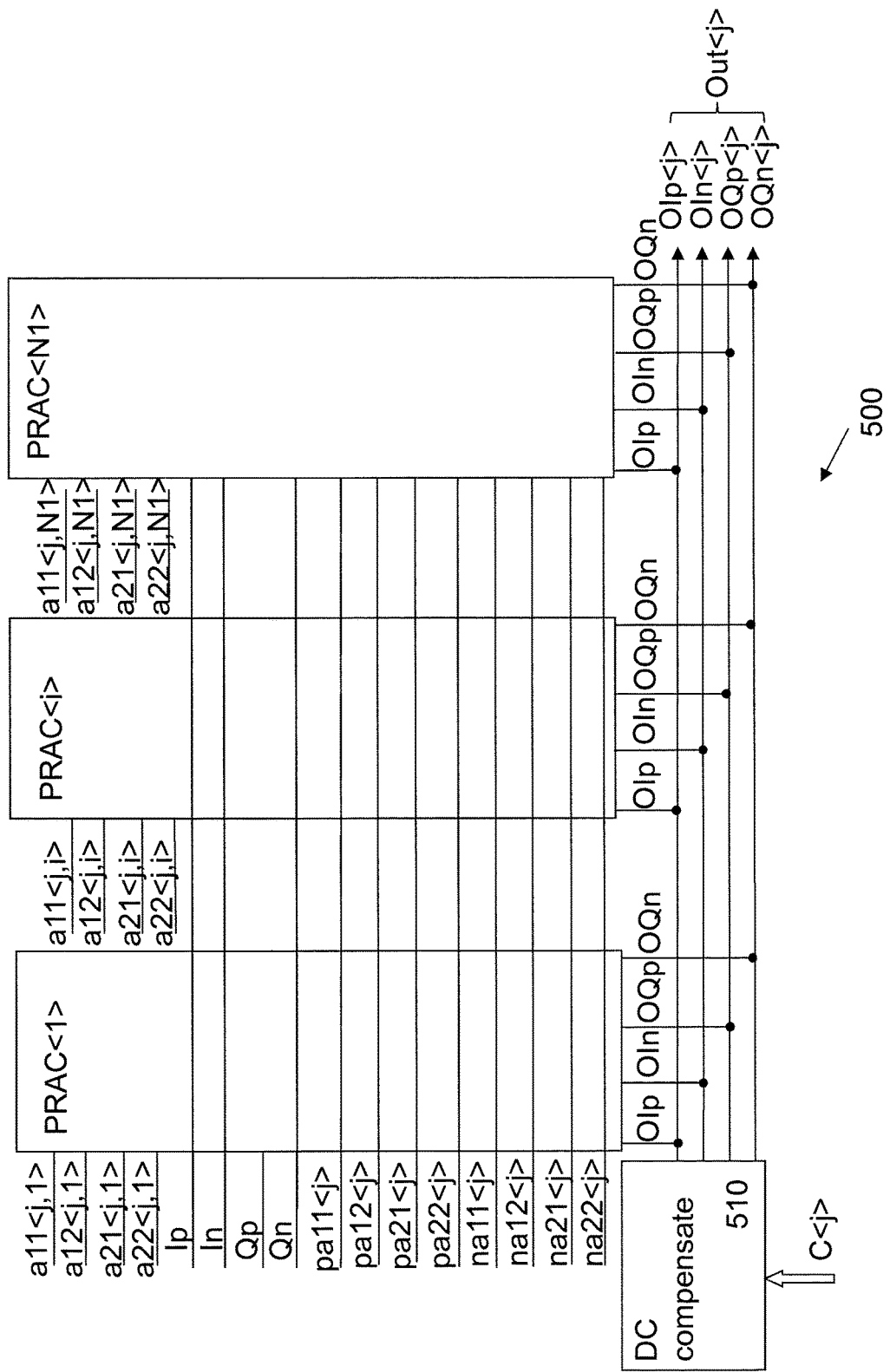
FIG. 5 is a block view illustrating a Phase Rotator and Amplitude control Unit (PRAU) according to embodiments herein.

FIG. 5 shows a block diagram of one of the K PRAUs, e.g. the j-th PRAU<j>, denoted as PRAU 500, according to embodiments herein. The amplitude control coefficients may comprise a number of digital bits, e.g. N1 digital bits. To implement the PRAU 500 which may be amplitude controlled by N1 digital bits, each PRAU 500 comprises a plurality N1 of Phase Rotator and Amplitude control Circuits PRAC<1>, . . . PRAC<i>, . . . PRAC<N1> as shown in FIG. 5, using differential weighting factors, such as binary weighting As discussed above, the phase and amplitude control parameters may be split into amplitudes and signs, so the phase and amplitude control parameters comprise sign control signals pa11, pa12, pa21, pa22, na11, na12, na21, na22 and positive amplitude coefficient signals A11, A12, A21, A22. In FIG. 5, a11<j, i>, a12<j, i>, a21<j, i>, a22<j, i> are positive amplitude coefficient signals which represent one bit, i.e. the i-th bit, of the positive amplitude control coefficients A11, A12, A22, A22 respectively for the j-th PRAU, and pa11<j>, pa12<j>, pa21<j>, pa22<j>, na11<j>, na12<j>, na21<j>, na22<j> represent the positive and negative sign signals for the j-th PRAU. Each PRAC<1>, . . . PRAC<i>, . . . PRAC<N1> is configured to receive one bit of the positive amplitude coefficient signals, e.g. the i-th PRAC<i> is configured to receive the i-th bit of the positive amplitude coefficient signals a11<j, i>, a12<j, i>, a21<j, i>, a22<j, i>, where i=1, . . . , N1 and j=1, . . . K.

Figure 6:
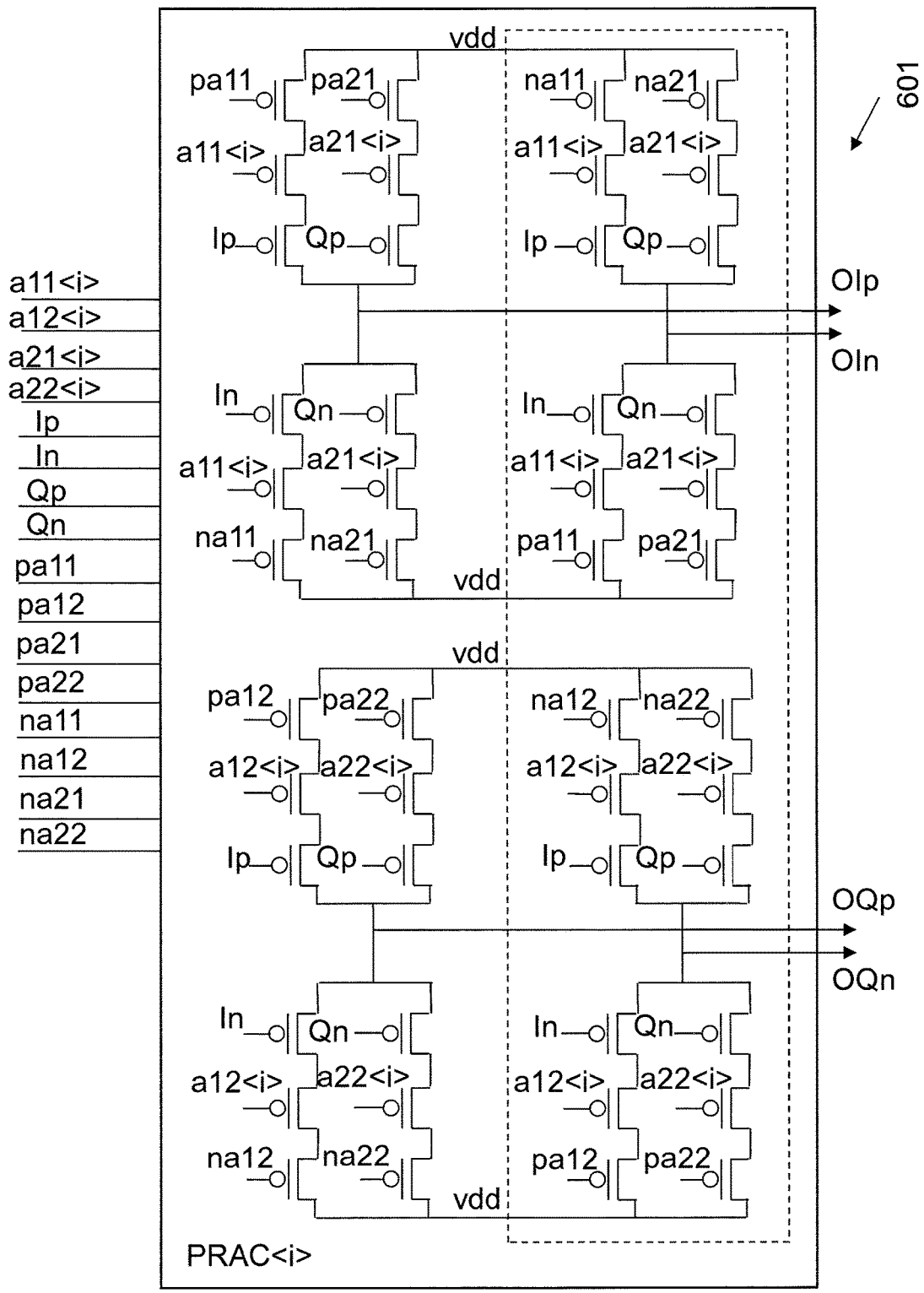
FIGS. 6(a) and (b) are schematic views illustrating embodiments of a Phase Rotator and Amplitude control Circuit (PRAC).
Figure 6:
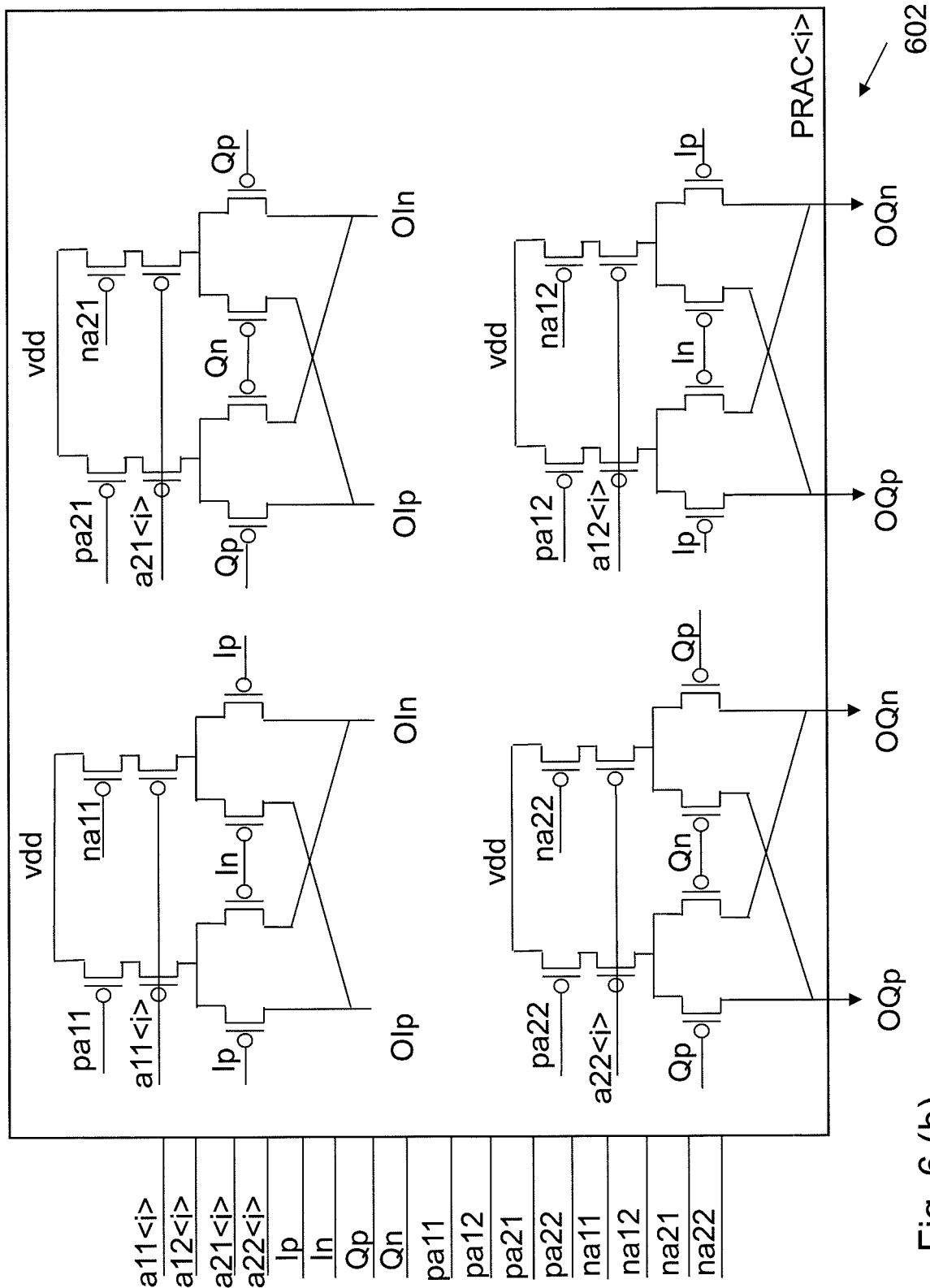

FIG. 6(a) shows a schematic view of one of the N1 PRACs, e.g. the i-th PRAC<i>, according to one embodiment herein. FIG. 6(b) shows a schematic view of one of the N1 PRACs, e.g. the i-th PRAC<i>, according to another embodiment herein.

As shown in FIGS. 6(a) and (b), each PRAC comprises an input port comprising in-phase and quadrature-phase inputs Ip, In, Qp, Qn to receive the in-phase and quadrature phase input signals; an output port comprising in-phase and quadrature-phase outputs OIp, OIn, OQp, OQn; and control inputs to receive the phase and amplitude control parameters.

Each PRAC further comprises a plurality of switched transconductance branches, wherein each switched transconductance branch comprises one transconductance transistor connected in series with two switching transistors. In FIG. 6(a), each transconductance transistor is connected in series with its own two switching transistor. In FIG. 6(b), the transconductance transistors are pairwise connected in series with the same two switching transistors.

As shown in FIGS. 6(a) and (b), a gate of one switching transistor is coupled to one of the sign control signals pa11, pa12, pa21, pa22, na11, na12, na21 na22, a gate of another switching transistor is coupled to one of the positive amplitude coefficient signals a11<i>, a12<i>, a21<i>, a22<i>, a gate of the transconductance transistor is coupled to one of the in-phase and quadrature-phase inputs Ip, In; Qp, Qn, and a drain of the transconductance transistor is coupled to one of the in-phase and quadrature-phase outputs OIp, OIn, OQp, OQn.

As seen from FIGS. 6(a) and (b), each transconductance branch is a current branch which implements one operation and generates current to the output. For example, the first branch to the left implements OIp=a11·pa11·Ip, and the four branches to the left which connected to the output OIp implement operation OIp=a11·pa11·Ip+a21·pa21·Qp+a11·na11·In+a21·na21·Qn, i.e. the first two equations in Eq.(5), for calculating OIp. Since the drain of the transconductance transistor is coupled to one of the in-phase and quadrature-phase outputs, and it is in series with the two switching transistor, the positive amplitude coefficient signals and the sign control signals will control if it will contribute current to the outputs.

To simplify, the index j is omitted in the denotation of the positive amplitude coefficient signals and sign control signals, and they are just denoted as a11<i>, a12<i>, a21<i>, a22<i> and pa11, pa12, pa21, pa22, na11, na12, na21 na22 in FIGS. 6(a) and (b).

According to some embodiments herein, each PRAU<1>, ... PRAU<j>, ... PRAU<K> has independent phase and amplitude control parameters inputs and independent baseband quadrature outputs. The K outputs Out<1>, ... Out<j>, ... Out<K> from the PRAUs in each element 120 are analog quadrature baseband signals, usually in differential form. Thus, as shown in FIG. 5, each of the multiple analog output signals, e.g. the j-th output Out<j> of the j-th PRAU<j> may comprise in-phase and quadrature-phase output signals OIp<j>, OIn<j>, OQp<j>, OQn<j>. To generate the j-th in-phase and quadrature-phase output signals OIp<j>, OIn<j>, OQp<j>, OQn<j>, the in-phase outputs (OIp, OIn) from each PRAC (PRAC<1>, ... PRAC<i>, ... PRAC<N1>) are arranged to be combined, e.g. connected together, to generate the in-phase output signal (OIp<j>, OIn<j>) of the output signal (Out<j>), and the quadrature-phase outputs (OQp, OQn) from each PRAC (PRAC<1>, ... PRAC<i>, ... PRAC<N1>) are arranged to be combined, e.g. connected together, to generate the quadrature-phase output signal (OQp<j>, OQn<j>) of the output signal (Out<j>), wherein j=1, ... K. For example, the outputs OIp from all PRACs are connected together to generate OIp<j>, the outputs OIn from all PRACs are connected together to generate OIn<j> etc.

It can be seen that the structure of the PRAC in each PRAU according to embodiments herein is totally different from conventional variable gain amplifiers and/or phase rotators which are built with feedback mechanism. The conventional variable gain amplifiers and/or phase rotators have limited accuracy in adjusting the phase and gain of the signals, especially at higher frequency. Further, the conventional amplifiers consume more power as the bandwidth increases. However, as described above, the PRAU in the beamforming receiver 100 comprises a plurality N1 of PRAC and each PRAC comprises a plurality of switched transconductance branches. The switched transconductance branches are controlled by the phase and amplitude control parameters which comprise sign control signals and positive amplitude coefficient signals, and each positive amplitude coefficient signal has N1 digital bits, the switched transconductance branches in the PRAU are digital controlled to generate currents to the outputs, therefore relatively high accuracy can be achieved. Further, the branches can be configured with an open drain topology, which can be selectively enabled or disabled, which facilitates an implementation with relatively low power consumption.

Below, calculations of the required phase shift ψj for each PRAU in each element and calculations of the phase and amplitude control parameters from the phase shift ψj will be described.

For the j-th PRAU <j> in the element <n, m>, the required phase shift ψj may be expressed as $$\psi j = 2\pi fc \cdot td + m \cdot Aj + n \cdot Ej + \Delta Temp \cdot tc \quad (6)$$

Where n and m are element address index, Aj is azimuth angle, Ej is elevation angle, fc is carrier frequency, td is local oscillator time delay error, ΔTemp is temperature difference and tc is temperature coefficient. This equation may be used to create required phase shift for the j-th output beam signals of the element in the n-th row and m-th column of the element array 110. A controller unit may be used to change index j, j=1, 2, ..., K, to get K phases for the K output beam signals.

FIGS. 7(a) and (b) show examples of the parameter calculator 125, denoted as parameter calculator 700, for calculating the phase and amplitude control parameters from the multiple beam parameters, e.g. azimuth vector, A1, ..., AK, elevation vector, E1 ... EK, and amplitude vector, Amp1, ..., AmpK based on Eq. (6).

As shown in FIGS. 7(a) and (b), the parameter calculator 700 comprises a controller 701 to change index j for the individual phase shifts ψj, where j=1, 2 ... K. It means that the controller 701 at each parameter refresh period, controls the parameter calculator 700 to recalculate the phase and amplitude control parameters for j-th beam, where j=1, 2, ..., K.

The parameter calculator 700 further comprises a plurality of multiplier 702 which comprising element address index inputs (n, m), multiple angel parameters inputs to receive the azimuth and elevation vectors Ak, Ek, compensation parameter inputs to receive compensation parameters fc, td, tc, ΔTemp. The multipliers perform the four multiply operations in Eq. (6) with coefficients α1, α2, α3, α4.

The parameter calculator 700 further comprises a phase rotation look-up-table (LUT) to store sinusoid values of phase shifts ψj.

The phase rotation LUT implements sinusoid functions, i.e. it stores the values of Amp<n,m,j>*sin(ψj) and Amp<n,m,j>*cos(ψj).

According to some embodiments herein, the phase rotation LUT is a full table comprising sinusoid values of the phases from 0 to 360 in degree or 0 to 2π in rad. In this case, ψj may be linearly mapped to the address of the phase rotation LUT. To reach high resolution, when implemented in digital Random Access Memory (RAMs), the whole phase range can be divided into Np units, where Np is $2^{np}$.

As the sinusoid function of the phase shift is a periodic function, to limit the size of the LUT in one period, module operation may be needed, which is expressed as:

$$\theta j = \mathrm{mod}(2\pi fc \cdot td + m \cdot Aj + n \cdot Ej + \Delta \mathrm{Temp} \cdot tc, \theta_{Mod}) \tag{7}$$

where mod(y, x) is a modulus operation of a given y with modulo x, and $\theta_{Mod}$ is chosen from $\pi/2$, $\pi$, or $2\pi$.

Therefore the parameter calculator 700 may further comprises a modulus operator 706. The modulus operator 706 operates based on Eq. (7).

Figure 7:
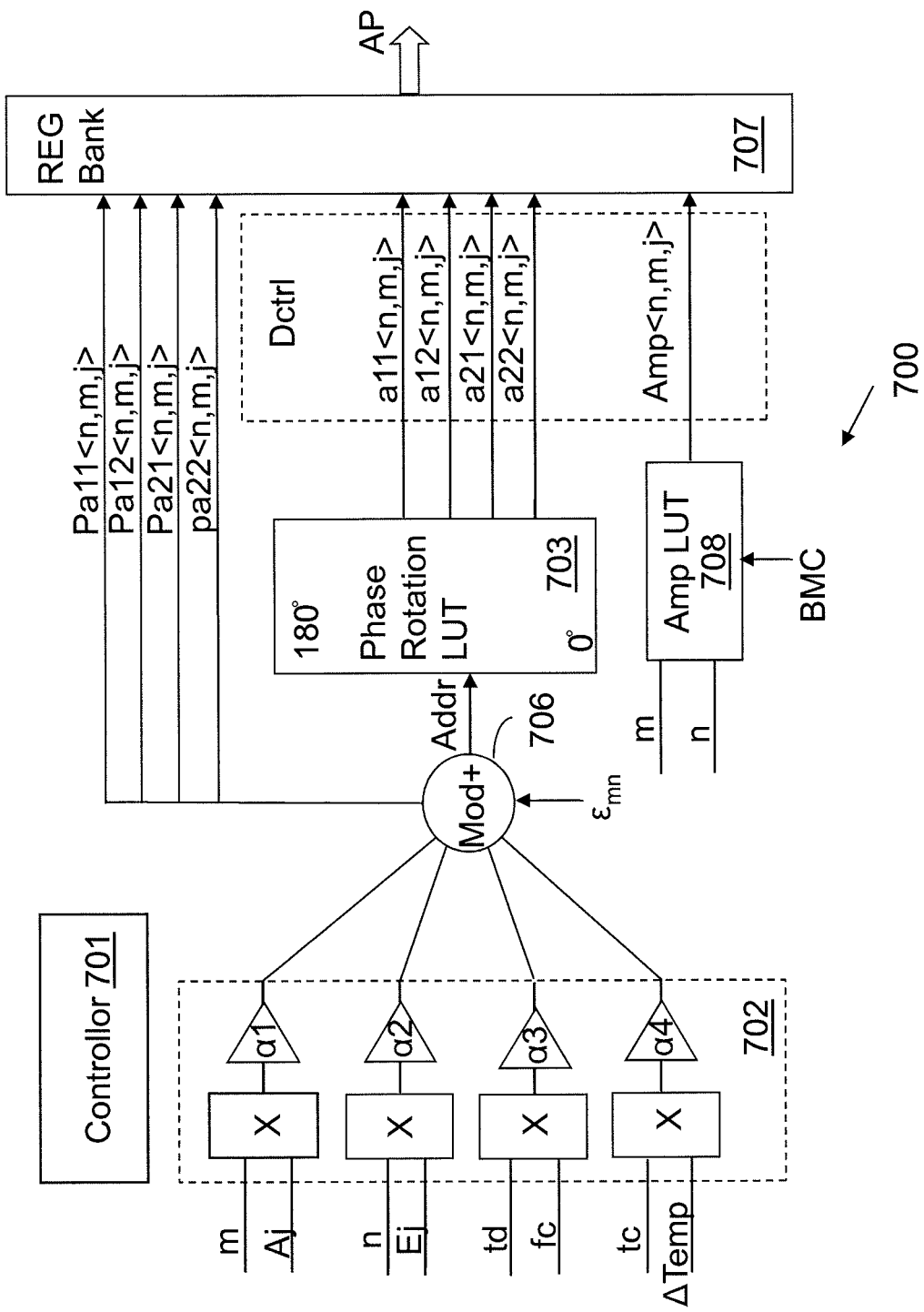
FIGS. 7(a) and (b) are block views illustrating example embodiments of a parameter calculator.
Figure 7:
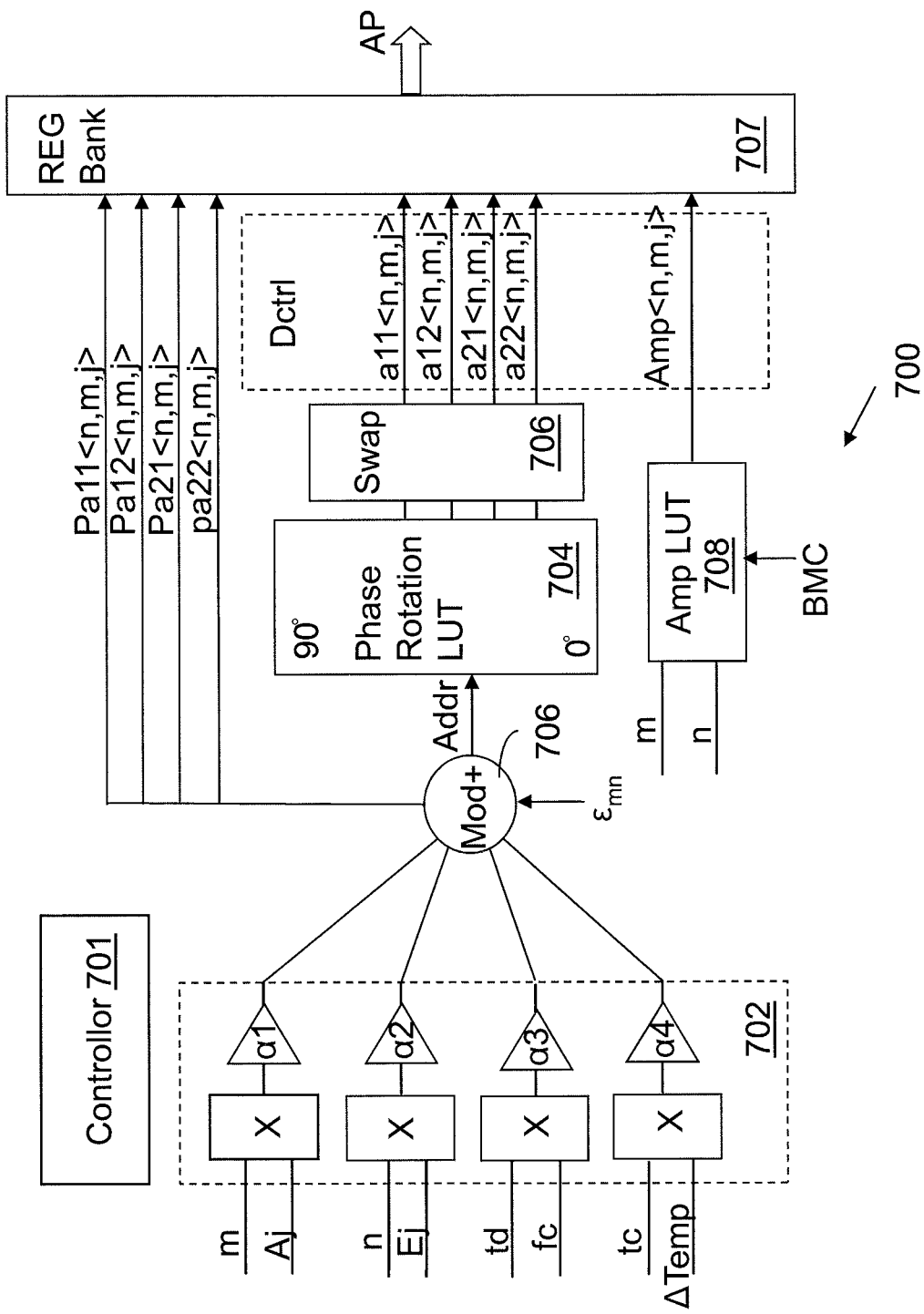

According to some embodiments herein, the phase rotation LUT is a half table comprising sinusoid values of phases from 0 to 180 in degree or 0 to $\pi$ in rad, as the phase rotation LUT 703 shown in FIG. 7(*a*).

According to some embodiments herein, the phase rotation LUT may be a quart of the full table, for ψj from 0 to 90 in degree, or 0 to $\pi/2$ in rad, as the phase rotation LUT 704 shown in FIG. 7(*b*). Then the size of the phase rotation LUT 704 becomes 4 times smaller than the full table. In such case the quadrature sinusoid functions need to be swapped in every phase jump of $\pi/2$. Thus the parameter calculator 700 further comprises a swap unit 705.

The phase and amplitude control parameters, i.e. the positive amplitude coefficient signals a11<n,m,j>, a12<n,m,j>, a21<n,m,j>, a22<n,m,j> and the positive sign control signals pa11<n,m,j>, pa12<n,m,j>, pa21<n,m,j>, pa22<n,m,j> may be calculated by the parameter calculator 700, stored in the register bank 707 and input to the PRAUs via data bus AP as shown in FIG. 7. The negative sign control signal na11<n,m,j>, na12<n,m,j>, na21<n,m,j> na22<n,m,j> may be generated from the positive sign control signals by inverters either in each PRAC or in PRAU (not shown).

According to some embodiments, the amplitude part Amp<n,m,j> may be separated, thus the parameter calculator 700 may further comprise an amplitude LUT 708 to store amplitude values Amp<n, m, j> of the amplitude vectors.

According to some embodiments herein, the amplitude LUT 708 further comprises a beam mode control input BMC and element address index inputs n, m to control which amplitude values to output depending on element address index n, m and a beam mode. The beam mode may be, e.g. all elements 120 have the same amplitude value, or each element 120 has a different amplitude values base on weighting factors.

According to some embodiments herein, the modulus operator 706 further comprises a compensation input Enm to receive phase compensation parameter and is further configured to correct phase errors caused by amplitude control at different levels.

Turning back to FIG. 5, according to some embodiments, each PRAU 500 further comprises a Direct Current (DC) compensation unit 510 to compensate a DC offset of the phase rotated signal, i.e. the output signals OIp<j>, OIn<j>, OQp<j>, OQn<j>.

As in the conventional variable gain amplifiers and/or phase rotators, there are different DC offsets at output of the amplifier/phase rotation circuitry when the phase rotation angle changes. This problem is solved by the DC compensation unit 510.

Figure 8:
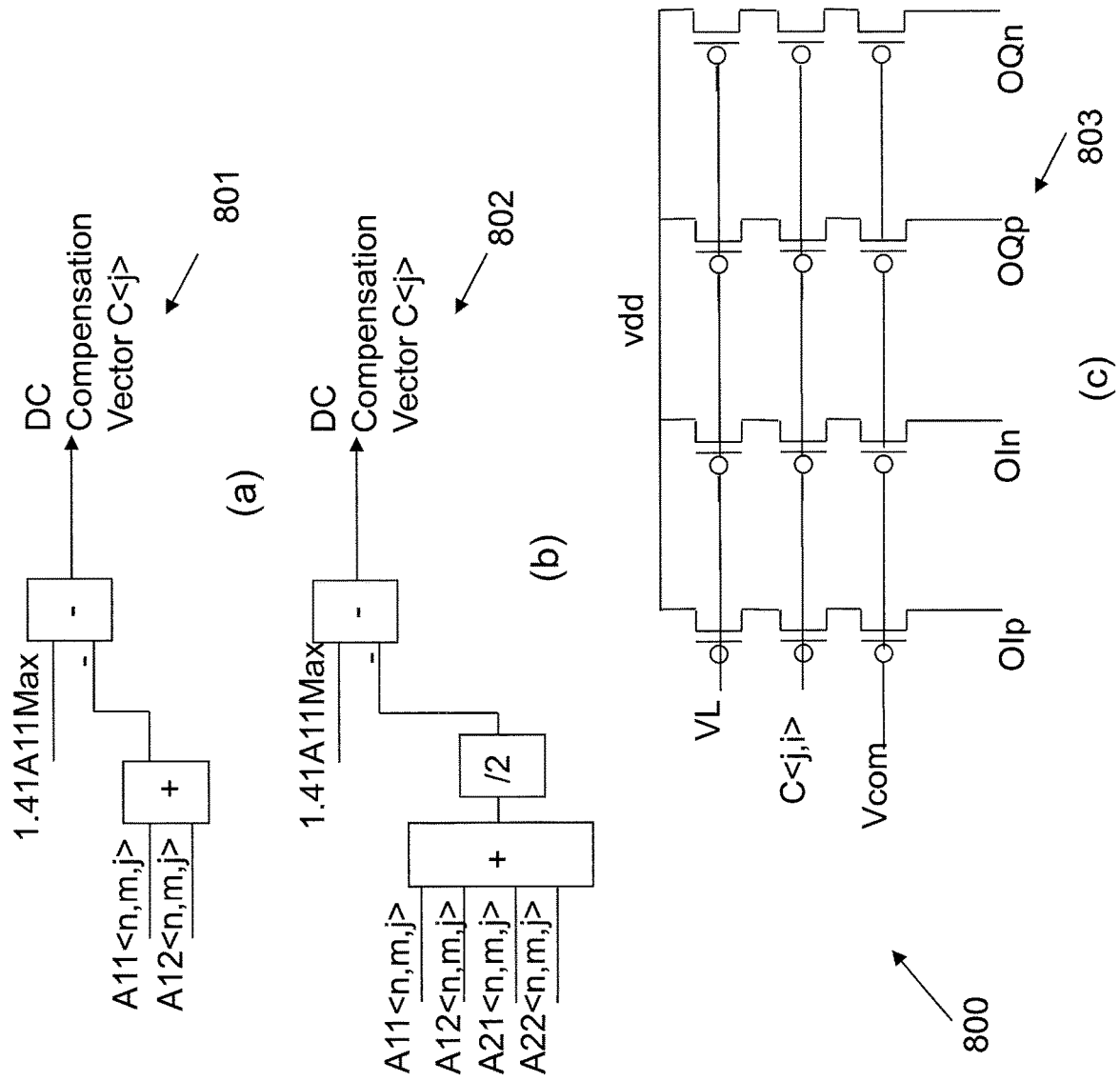
FIG. 8 illustrating one example of a DC compensation unit.

FIG. 8 shows one example of the DC compensation unit 510, denoted as compensation unit 800. The compensation unit 800 comprises a DC compensation calculator 801, 802 to calculate a DC compensation vector C<j,i> which comprising N1 digital bits, i=1, . . . N1, as shown in FIGS. 8(*a*) and (*b*).

The DC compensation unit 800 further comprises a plurality of DC compensation circuits to receive the DC compensation vector. FIG. 8(*c*) shows one of the DC compensation circuit 803 according to embodiments herein. The DC compensation circuit 803 comprises four switched transconductance branches, each switched transconductance branch comprises one transconductance transistor connected in series with two switching transistors. The sizes of transistors in the transconductance branch are matched to the sizes of transistors in the transconductance branch in the PRAC. The drains of the transconductance transistors in each DC compensation circuit 803 are coupled to the in-phase and quadrature-phase outputs OIp, OIn, OQp, OQn to inject compensation currents to the outputs of the PRAU.

As the total current in the output is proportional to $|\cos(\Psi j)|+|\sin(\Psi j)|$ and it will reach the peak of $\sqrt{2}$ at 45, and reach the minimum of 1 at 0° and 90°. So the compensation current may be digitally calculated as:

$$C<j> = \mathrm{Amp}<j>(\sqrt{2}-|\sin(\Psi j)|-|\cos(\Psi j)|) \tag{8}$$

Where Amp<j> is the amplitude for the j-th output beam signal. This is implemented in the DC compensation calculators as shown in FIGS. 8(*a*) and (*b*), which comprise digital adder and subtractor. In FIG. 8(*a*), the DC compensation calculator 801 is configured to generate DC compensation vector C<j> which comprising symmetric coefficients and the compensation is performed for symmetric quadrature signals, for which the reduced size of the phase rotation LUT is used. In FIG. 8(*b*), the DC compensation calculator 802 is configured to generate DC compensation vector C<j> which comprising asymmetric coefficients, for which the full size LUT is used, where the 4 factors A11<n,m,j>, A12<n,m,j>, A21<n,m,j>, A22<n,m,j> may have different values.

Turning back to FIG. 3, where the block diagram of an element 120 is shown. According to some embodiments herein, the mixer 123 in each element 120 may be a quadrature homodyne mixer, driven by quadrature local oscillator signals, LO-i, LO-q, for down-converting the amplified multiple radio signals to quadrature baseband signals, or a super heterodyne mixer for down-converting the amplified multiple radio signals to intermediate frequency signals, or a two-stage image rejection mixer where a first stage of the image rejection mixer is a quadrature mixer which down-converts the amplified multiple radio signals into quadrature intermediate frequency signals, and a second stage of the image rejection mixer down-converts the quadrature intermediate frequency signals to quadrature baseband signals.

According to some embodiments herein, the down converted quadrature baseband signals are filtered by the filter 124, which may comprise quadrature filters Filter I and Filter Q and generate the in-phase and quadrature phase input signals Ip, In, Qp and Qn to the K paralleled PRAU<1>, . . . PRAU<j>, . . . PRAU<K>. The filter 124 may be either passive or active filters.

Figure 9:
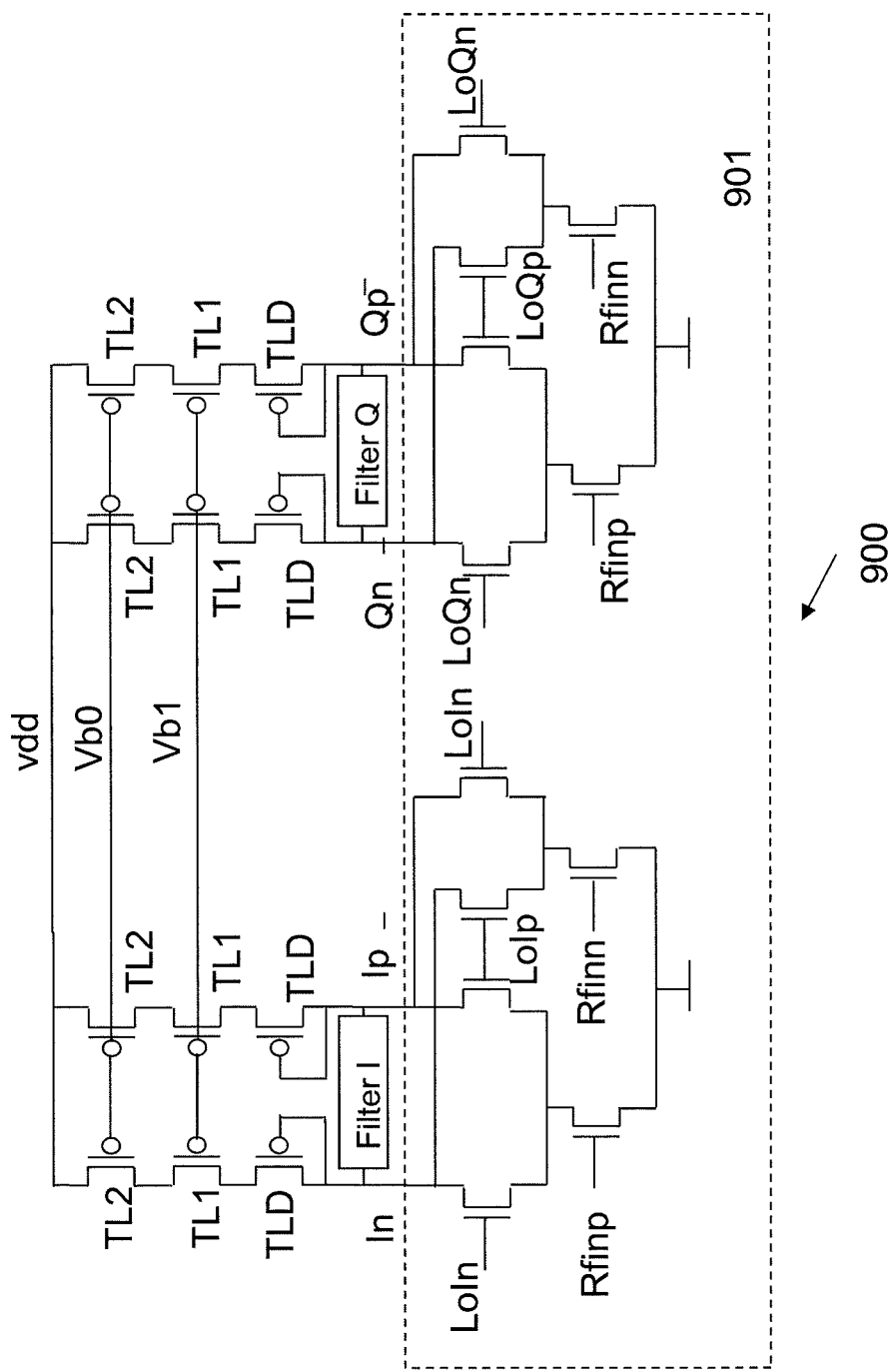
FIG. 9 is a schematic diagram illustrating one example of a mixer according to embodiments herein.

FIG. 9 shows one example of the mixer 123 according to embodiments herein, denoted as a quadrature mixer 900. The quadrature mixer 900 comprises a quadrature mixer core 901 to receive RF signals RFinp, RFinn and LO signals LoIn, LoIp, LoQp, LoQn as in any conventional mixers. Further, the quadrature mixer 900 according to embodiments herein has four output branches. Each output branch comprises a load branch comprising one diode configured loading transistor TLD connected in series with two loading transistors TL1, TL2. The sizes of the loading transistors are matched to the sizes of the transistors in the switched transconductance branch in the PRAC as shown in FIG. 6(a).

Figure 10:
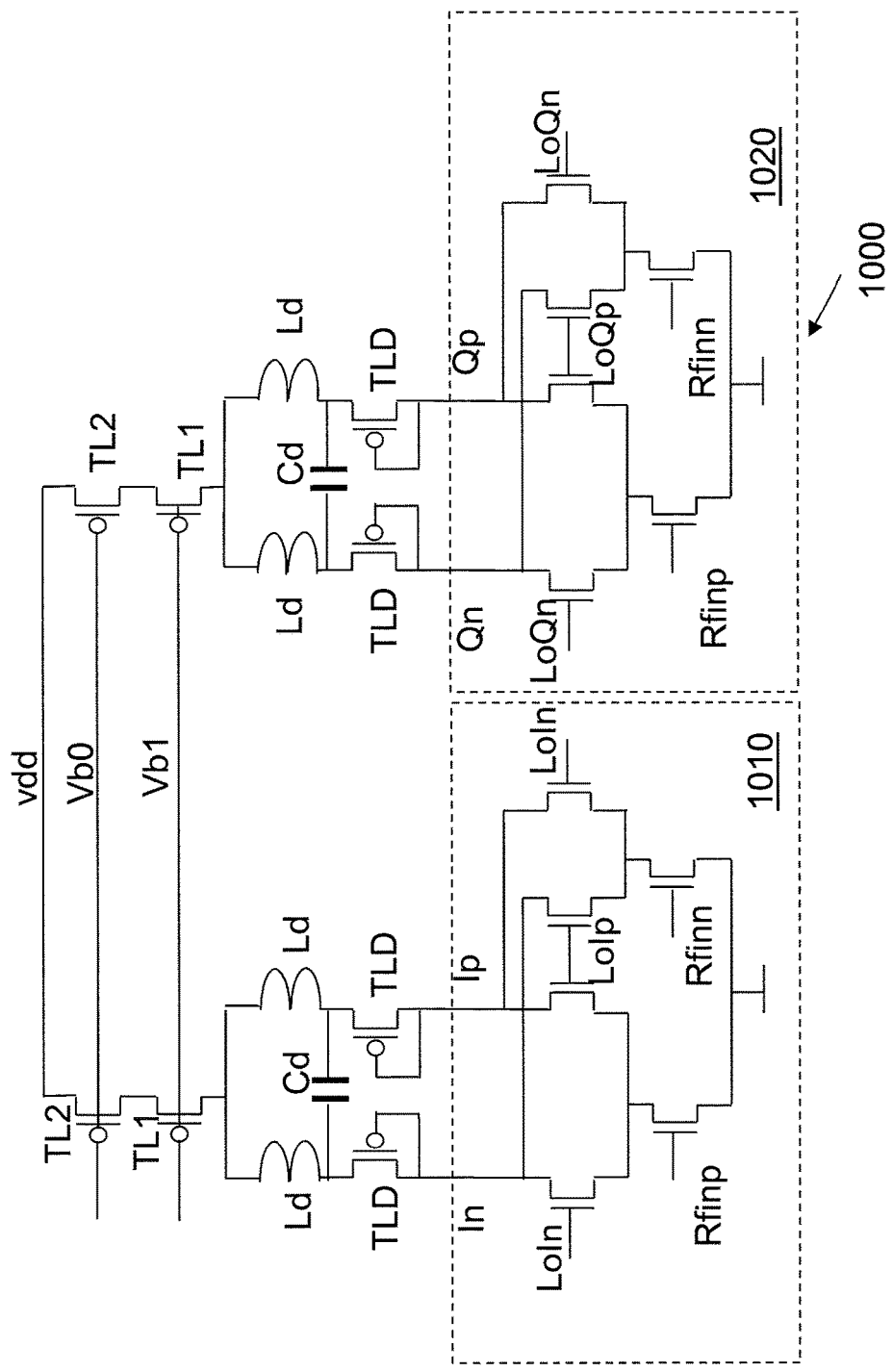
FIG. 10 is a schematic diagram illustrating another example of a mixer according to embodiments herein.

FIG. 10 shows another example of the mixer 123 according to embodiments herein, denoted as a quadrature mixer 1000. The quadrature mixer 1000 also comprises a quadrature mixer core 1010 comprising an in-phase mixer 1010 and quadrature-phase mixer 1020 to receive the RF signals RFinp, RFinn and LO signals LoIn, LoIp, LoQp, LoQn as in any conventional mixers. The quadrature mixer 1000 has four output branches, each output branch comprises a load branch comprising one diode configured loading transistor TLD in series with an inductor Ld. Each in-phase mixer 1010 and quadrature-phase mixer 1020 comprises a tunable capacitor Cd connected between the two output branches. Each in-phase mixer 1010 and quadrature-phase mixer 1020 further comprises two loading transistors TL1, TL2 stacked on top of the two inductors Ld. The sizes of the loading transistors are matched to the sizes of the transistors in the switched transconductance branch in the PRAC as shown in FIG. 6(b).

The inductors Ld and tunable capacitor Cd form an inductive tank circuit which extends the bandwidth of the mixer 1000.

Now turning back to FIGS. 1 and 2, there are several ways of combining the outputs from the element array 110 to generating the multiple output beam signals. According to some embodiments, when the element array 110 is arranged to form a square, a rectangle or a cross shape, and is configured to comprise N rows and M columns, or when the element array 110 is configured to comprise N rows, wherein each raw has a different number of elements and is arranged to form a hexagon shape, the jth output signals Out<j> from the elements in one column are combined by connecting together all jth outputs of the elements in said column to generate the jth output of the multiple output beam signals, wherein j=1 . . . K. In these cases, only one column is used.

According to some embodiments, the beamforming receiver 100 may be configured to be in a K beam mode and generate K output beam signals. Then the j-th outputs of each element in the element array 110, i.e. the j-th outputs of all elements in the element array 110, are connected together to generate the jth output of the K output beam signals, where j=1, . . . K, thereby K output beam signals are generated.

According to some embodiments, the beamforming receiver, when configured in the K beam mode, may further comprise 2*K analog to digital converters connected to the outputs of the K output beam signals for further digital signal processing.

Figure 11:
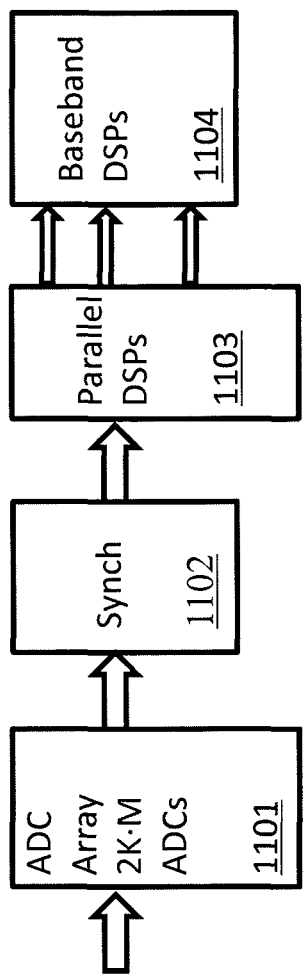
FIG. 11 is a block diagram illustrating examples of processing units comprised in the beamforming receiver.

According to some embodiments, the beamforming receiver 100 may be configured to be in a K*M beam mode and generate K multiplied by M output beam signals. Then the j-th outputs of the elements in column m are connected together to generate K output analog signals for each column, where j=1, . . . , K and m=1, . . . , M. The beamforming receiver 100 may further comprise, as shown in FIG. 11, ADC array 1101 which comprises 2*K*M analog to digital converters to convert the generated K output analog signals for each column to K digital signals for each column.

The beamforming receiver 100 may further comprise a synchronization unit 1102 to align the K digital signals for each column in time. The beamforming receiver 100 further comprise a digital signal processor 1103, 1104 to perform operations on the aligned K digital signals for each column to generate the K*M output beam signals. For example, the synchronized K digital signals are processed by parallel DSPs 1103 which separate the K digital signal by DSP algorithms, such as 2D-FFTs, a complex weighted lattice FIR filter, or any others alike. The separated K digital signals are then processed by baseband DSPs 1104 for de-modulating the separated K digital signals.

Figure 12:
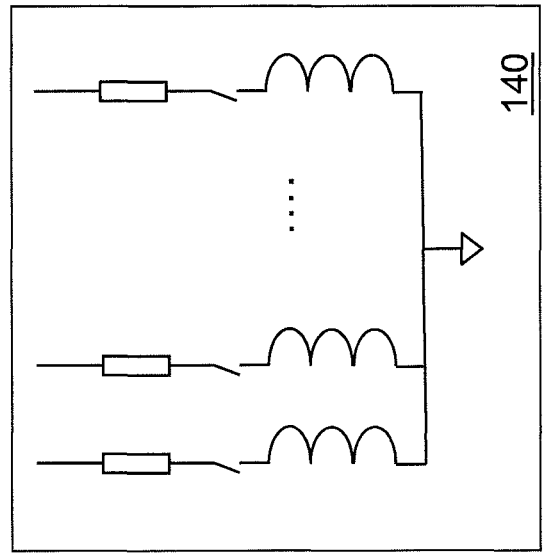
FIG. 12 is a schematic diagram showing a loading unit according to embodiments herein.

According to some embodiments, the loading unit 140 in the beamforming receiver 100 may comprise a plurality of switched resistor branches, as shown in FIG. 12. Each switched resistor branch is connected to one output of a PRAU, e.g. each OIp<j>, OIn<j>, OQp<j>, OQn<j> in the j-th PRAU<j> is connected to a switched resistor branch. The switched resistor branches are controlled so that some output signals from the PRAUs may be merged as to improve matching and reduce the noise of the PRAUs, or some of PRAUs may be disabled to save power, when a desired number of output beam signals is less than the maximum number of output beam signals available from the beamforming receiver 100.

Figure 13:
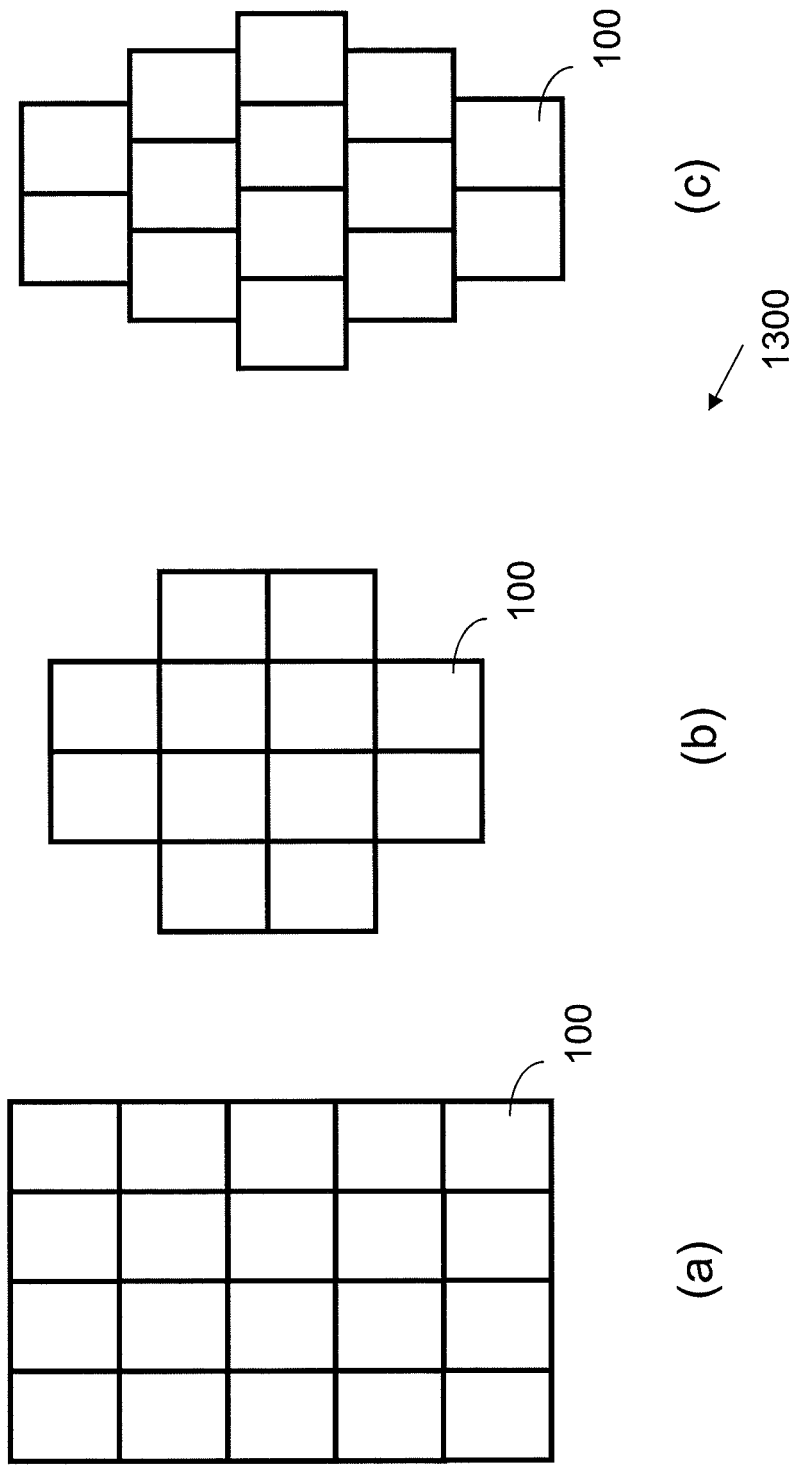
FIG. 13 is a diagram showing examples of a beamforming receiver matrix.

FIG. 13 shows examples of a beamforming receiver matrix 1300, in which the beamforming receiver 100 according to embodiments herein may be implemented. The beamforming receiver matrix comprises a plurality of beamforming receivers 100, and may be arranged to form different shapes. For example, as shown in FIG. 13(a), the beamforming receiver matrix is formed in a square or rectangle shape, and may comprise Nr rows and Mc columns, where Nr may or may not equal to Mc. The beamforming receiver matrix may be arranged to form a cross shape as shown in FIG. 13(b), where the beamforming receivers 100 at corners of the matrix are omitted. The beamforming receiver matrix may be arranged to form a hexagon shape as shown in FIG. 13(c), where each consecutive row has different numbers of the beamforming receivers and is placed with an offset to each other.

According to some embodiments, the beamforming receiver matrix 1300 may further comprise output combiners to combine output signals from the beamforming receivers 100 in baseband, and may further comprise clock distribution networks comprising delay matched transmission lines and delay alignment units.

To summarize, some advantages of the beamforming receiver 100 according to embodiments herein are:

In some embodiments, the beamforming receiver 100 may be used in K-beam analog mode to generate K output beam signals.

In some embodiments, the beamforming receiver 100 may be used in hybrid analog-digital mode to generate K*M output beam signals.

The beamforming receiver 100 can be implemented with relatively low power consumption and high accuracy. For example, in some embodiments described above, the phase rotator and amplitude control unit in the beamforming receiver 100 comprises a plurality N1 of PRAC and each PRAC comprises a plurality of switched transconductance branches. The switched transconductance branches can be controlled in a way that facilitates an implementation with relatively high accuracy in phase rotation and amplitude control and low power consumption.

The beamforming receiver 100 can be implemented with ADCs separated from RF integrated circuits, which makes it easier to design and implement, and also has relatively low cost compared with pure digital beamforming.

The beamforming receiver 100 can be implemented to occupy a relatively small area.

The beamforming receiver 100 can be implemented to have relatively good linearity.

Figure 14:
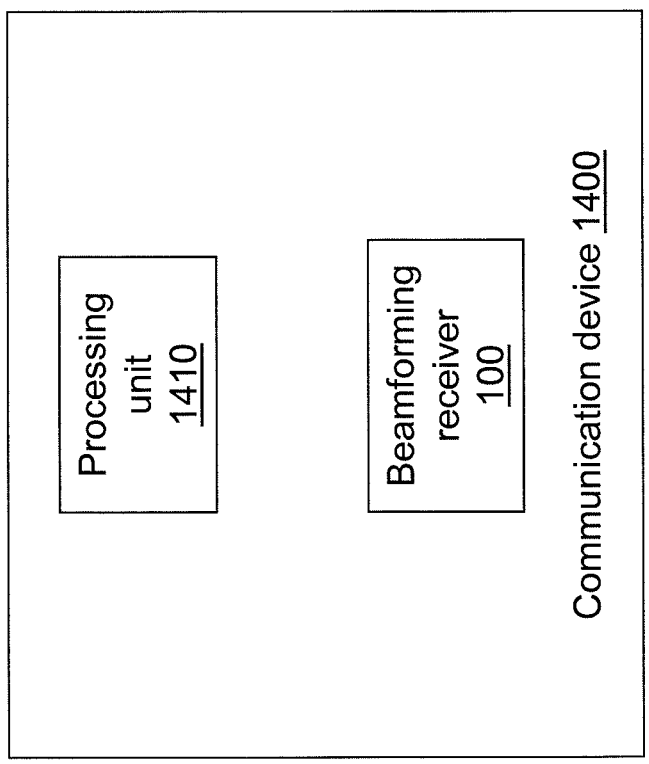
FIG. 14 is a block diagram illustrating a wireless communication device in which embodiments herein may be implemented.

The beamforming receiver 100 and the beamforming receiver matrix 1300 according to embodiments herein may be employed in various wireless communication devices. FIG. 14 shows a block diagram for a wireless communication device 1400, which may be, e.g. a base station or a wireless terminal, such as a mobile phone, machine-type communication device, a computer or tablet computer or other device comprising a cellular data modem etc. The wireless communication device 1400 may comprise other units, where a processing unit 1410 is shown, which may interactive with the controller 701 in the parameter calculator 700 for different parameter settings or operating modes.

Those skilled in the art will understand that transistors in the PRACs, in the DC compensation circuit 803, in the quadrature mixer 900, 1000 as shown in FIGS. 6, 8, 9, 10, may be any types of transistors, e.g. Field-Effect Transistors (FET), Metal-Oxide-Semiconductor FET (MOSFET), Junction FET (JFET), or Bipolar Junction Transistors (BJT) etc.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A beamforming receiver for receiving multiple radio signals and generating multiple output beam signals, the beamforming receiver comprising:
   multiple beam parameter inputs to receive multiple beam parameters;
   an element array comprising a plurality of elements, wherein each element comprises:
      an antenna to receive the multiple radio signals;
      an amplifier to amplify the received multiple radio signals;
      a mixer to down-convert the amplified multiple radio signals and generate in-phase and quadrature phase signals;
      a filter to filter the generated in-phase and quadrature phase signals and generate in-phase and quadrature phase input signals;
   a plurality K of Phase Rotator and Amplitude control Unit (PRAU) configured to perform phase rotation and amplitude control of the in-phase and quadrature phase input signals based on phase and amplitude control parameters and generate multiple analog output signals with individual phase shifts; and
   a parameter calculator to generate the phase and amplitude control parameters from the multiple beam parameters which are related to K directions of the multiple radio signals.

2. The beamforming receiver of claim 1, wherein the multiple beam parameters comprise an azimuth vector, an elevation vector, and an amplitude vector.

3. The beamforming receiver of claim 1:
   wherein the element array is arranged to form a square, a rectangle, or a cross shape;
   wherein the element array is configured to comprise N rows and M columns;
   wherein the j-th output signals from the elements in one column are combined by connecting together all j-th outputs of the elements in the column to generate the j-th output of the multiple output beam signals;
   wherein j=1 . . . K.

4. The beamforming receiver of claim 1:
   wherein the element array is configured to comprise N rows, wherein each consecutive row has a different number of elements and is arranged to form a hexagon shape, and
   wherein the j-th output signals from the elements in one column are combined by connecting together all j-th outputs of the elements in said column to generate the j-th output of the multiple output beam signals, wherein j=1 . . . K.

5. The beamforming receiver of claim 1, wherein each PRAU is configured to perform phase rotation and amplitude control of the in-phase and quadrature phase input signals and generate one output of the multiple analog output signals with an individual phase shift, and wherein each PRAU comprises:
   a plurality N1 of Phase Rotator and Amplitude control Circuits (PRAC), wherein each PRAC comprises:
      an input port comprising in-phase and quadrature-phase inputs to receive the in-phase and quadrature phase input signals;
      an output port comprising in-phase and quadrature-phase outputs;
      control inputs to receive the phase and amplitude control parameters, wherein the phase and amplitude control parameters comprises sign control signals and positive amplitude coefficient signals, each positive amplitude coefficient signal has N1 digital bits;
      a plurality of switched transconductance branches, wherein each switched transconductance branch comprises one transconductance transistor connected in series with two switching transistors, wherein a gate of one switching transistor is coupled to one of the sign control signals;
      wherein a gate of another switching transistor is coupled to one of the positive amplitude coefficient signals;
      wherein a gate of the transconductance transistor is coupled to one of the in-phase and quadrature-phase inputs; and
      wherein a drain of the transconductance transistor is coupled to one of the in-phase and quadrature-phase outputs;
   wherein each PRAC is configured to receive one bit of the positive amplitude coefficient signals;
   wherein each of the multiple analog output signals comprises in-phase and quadrature-phase output signals;
   wherein the in-phase outputs from each PRAC are arranged to be combined to generate the in-phase output signal of the output signal;
   wherein the quadrature-phase outputs from each PRAC are arranged to be combined to generate the quadrature-phase output signal of the output signal (Out<j>)
   wherein j=1, . . . K.

6. The beamforming receiver of claim 1, wherein the parameter calculator comprises:
   a controller configured to change index j for the individual phase shifts ($\psi j$), wherein j=1, 2 . . . K;
   a plurality of multipliers comprising element address index inputs (n, m), multiple angle parameters inputs to receive the azimuth and elevation vectors, and compensation parameter inputs to receive compensation parameters;
   a phase rotation Look Up Table (LUT) configured to store sinusoid values of the individual phase shifts ($\psi j$);
   an amplitude LUT configured to store amplitude values of the amplitude vectors; and
   a modulus operator.

7. The beamforming receiver of claim 6, wherein the phase rotation LUT is:
  a full table comprising sinusoid values of phases from 0 to 360 in degree or 0 to $2\pi$ in rad; or
  a half table comprising sinusoid values of phases from 0 to 180 in degree or 0 to $\pi$ in rad.

8. The beamforming receiver of claim 6:
  wherein the phase rotation LUT is a quarter of the full table comprising sinusoid values of phases from 0 to 90 in degree, or 0 to $\pi/2$ in rad; and
  wherein the parameter calculator further comprises a swap unit.

9. The beamforming receiver of claim 8:
  wherein the modulus operator comprises a compensation input to receive a phase compensation parameter; and
  wherein the modulus operator is configured to correct phase errors caused by amplitude control at different levels based on the phase compensation parameter.

10. The beamforming receiver of claim 6, wherein the amplitude LUT further comprises a beam mode control input and element address index inputs (n, m) to control which amplitude values to output depending on element address index (n, m) and a beam mode.

11. The beamforming receiver of claim 1, wherein the mixer comprises one of:
  a quadrature homodyne mixer for down-converting the amplified multiple radio signals to quadrature baseband signals;
  a super heterodyne mixer for down-converting the amplified multiple radio signals to intermediate frequency signals; or
  a two-stage image rejection mixer, where a first stage of the image rejection mixer is a quadrature mixer which down-converts the amplified multiple radio signals into quadrature intermediate frequency signals, and a second stage of the image rejection mixer down-converts the quadrature intermediate frequency signals to quadrature baseband signals.

12. The beamforming receiver of claim 1, wherein the filter comprises passive filters or active filters.

13. The beamforming receiver of claim 1, wherein the mixer comprises inductive tank circuits comprising inductors and a tunable capacitor to extend bandwidth of the mixer.

14. The beamforming receiver of claim 1:
  wherein the beamforming receiver is configured to be in a K beam mode to generate K output beam signals; and
  wherein the j-th outputs of each element in the element array are connected together to generate the j-th output of the K output beam signals;
  wherein j=1, . . . K, thereby K output beam signals are generated.

15. The beamforming receiver of claim 14, wherein the beamforming receiver further comprises 2*K analog to digital converters connected to outputs of the K output beam signals.

16. The beamforming receiver of claim 1:
  wherein the beamforming receiver is configured to be in a K*M beam mode to generate K multiplied by M output beam signals;
  wherein the j-th outputs of the elements in column m are connected together to generate K output analog signals for each column;
  where j=1, . . . K and m=1, . . . M; and
  wherein the beamforming receiver further comprises:
    an analog to digital array comprising 2*K*M analog to digital converters to convert the generated K output analog signals for each column to K digital signals for each column;
    a synchronization unit to align the K digital signals for each column in time; and
    a digital signal processor to perform operations on the aligned K digital signals for each column to generate the K*M output beam signals.

17. The beamforming receiver of claim 1:
  further comprising a loading unit comprising a plurality of switched resistor branches, each connected to one output of a PRAU;
  wherein the switched resistor branches are controlled so that some output signals from the PRAUs may be merged as to improve mismatch and reduce the noise of the PRAUs, or some of PRAUs may be disabled to save power, when a desired number of output beam signals is less than the maximum number of output beam signals available from the beamforming receiver.

18. The beamforming receiver of claim 1, further comprising a reference clock generating and splitting circuit to generate and distribute reference clock signals for each element.

19. A beamforming receiver matrix, comprising:
  multiple beamforming receivers, each beamforming receiver for receiving multiple radio signals and generating multiple output beam signals, each beamforming receiver comprising:
    multiple beam parameter inputs to receive multiple beam parameters;
    an element array comprising a plurality of elements, wherein each element comprises:
      an antenna to receive the multiple radio signals;
      an amplifier to amplify the received multiple radio signals;
      a mixer to down-convert the amplified multiple radio signals and generate in-phase and quadrature phase signals;
      a filter to filter the generated in-phase and quadrature phase signals and generate in-phase and quadrature phase input signals;
      a plurality K of Phase Rotator and Amplitude control Unit (PRAU) configured to perform phase rotation and amplitude control of the in-phase and quadrature phase input signals based on phase and amplitude control parameters and generate multiple analog output signals with individual phase shifts; and
      a parameter calculator to generate the phase and amplitude control parameters from the multiple beam parameters which are related to K directions of the multiple radio signals;
  wherein the beamforming receiver matrix comprises Nr rows and Mc columns and is arranged to form a square, a rectangle or a cross shape;
  wherein Mc and Nr are positive integers.

20. The beamforming receiver matrix of claim 19, further comprising:
  output combiners to combine output signals from the beamforming receivers in baseband; and
  clock distribution networks comprising delay matched transmission lines and delay alignment units.

21. A beamforming receiver matrix, comprising:
  multiple beamforming receivers, each beamforming receiver for receiving multiple radio signals and generating multiple output beam signals, each beamforming receiver comprising:
    multiple beam parameter inputs to receive multiple beam parameters;

an element array comprising a plurality of elements, wherein each element comprises:
  an antenna to receive the multiple radio signals;
  an amplifier to amplify the received multiple radio signals;
  a mixer to down-convert the amplified multiple radio signals and generate in-phase and quadrature phase signals;
  a filter to filter the generated in-phase and quadrature phase signals and generate in-phase and quadrature phase input signals;
  a plurality K of Phase Rotator and Amplitude control Unit (PRAU) configured to perform phase rotation and amplitude control of the in-phase and quadrature phase input signals based on phase and amplitude control parameters and generate multiple analog output signals with individual phase shifts; and
  a parameter calculator to generate the phase and amplitude control parameters from the multiple beam parameters which are related to K directions of the multiple radio signals;
wherein the beamforming receiver matrix comprises Nr rows and Mc columns;
wherein each consecutive row has a different number of beamforming receivers and is placed with an offset to each other, thereby form a hexagon shape.

22. The beamforming receiver matrix of claim 21, further comprising:
  output combiners to combine output signals from the beamforming receivers in baseband; and
  clock distribution networks comprising delay matched transmission lines and delay alignment units.

* * * * *